(12) United States Patent
Eggert et al.

(10) Patent No.: US 8,265,086 B2
(45) Date of Patent: Sep. 11, 2012

(54) MULTI-PATH TRANSPORT

(75) Inventors: Lars Rene Eggert, Helsinki (FI); Eero Jari Juhani Sillasto, Helsinki (FI)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 12/459,079

(22) Filed: Jun. 26, 2009

(65) Prior Publication Data

US 2010/0329248 A1  Dec. 30, 2010

(51) Int. Cl.
*G06F 15/173* (2006.01)
*G06F 15/16* (2006.01)
*H04L 12/28* (2006.01)
*H04L 12/56* (2006.01)

(52) U.S. Cl. ........ 370/400; 370/351; 370/389; 709/230; 709/231; 709/238; 709/239; 709/243

(58) Field of Classification Search .................. 370/400, 370/351, 389; 709/243, 238, 239, 242, 230, 709/231
See application file for complete search history.

(56) References Cited

U.S. PATENT DOCUMENTS

2008/0155103 A1* 6/2008 Bailey ........................ 709/227

FOREIGN PATENT DOCUMENTS

| EP | 1 294 137 A1 | 3/2003 |
| GB | 2 346 302 A | 8/2000 |
| WO | WO 2009/151985 A2 | 12/2009 |

OTHER PUBLICATIONS

"Fine-Grained Failover Using Connection Migration", Alex C. Snoeren, et al , Proc. of the Third Annual USENIX Symposium on Internet Technologies and Systems (USITS), Mar. 2001, pp. 1-12.
"Migratory TCP: Connection Migration for Service Continuity in the Internet", Proceedings of the $22^{nd}$ International Conference on Distributed Computing Systems (ICDCS'02), 2002, pp. 1-2.
Yihan et at. "The Case for Multipath Multimedia Transport over Wireless Ad Hoc Networks", Broadband Networks, 2004. First International Conference on San Jose, CA, USA Oct. 25-29, 2004: IEEE 2004, pp. 486-495.
Park et al. "MTCP: A Transmission Control Protocol for Multi-Provider Environment" IN: $3^{rd}$ IEEE Consumer Communications and Networking Conference, CCNC 2006. IEEE 2006, vol. 2, p. 735-739.
Narayanan et al. "MRTP: A Multi-Flow Real-Time Transport Protocol" IETF Standard-Working Draft, Sep. 7, 2004.

* cited by examiner

*Primary Examiner* — Ayaz Sheikh
*Assistant Examiner* — Tarell Hampton
(74) *Attorney, Agent, or Firm* — Harrington & Smith

(57) ABSTRACT

A method including operating in an apparatus a multi-point multi-path transport protocol providing a multi-point multi-path transport connection, and using said apparatus in said multi-point multi-path transport connection as a part of an end system formed by said apparatus and other apparatuses that are physically distinct from said apparatus.

21 Claims, 3 Drawing Sheets

MULTI-PATH TRANSPORT

TECHNICAL FIELD

The present invention generally relates to the Internet. The invention relates particularly, though not exclusively, to connection-oriented transport protocols.

BACKGROUND ART

In the Internet, connection-oriented transport protocols such as TCP (Transmission Control Protocol), SCTP (Stream Control Transmission Protocol) or DCCP (Datagram Congestion Control Protocol) are used to transfer data objects between applications on different end systems.

Presently, most transport protocols are limited to uni-path communications, that is, when a data object is transferred between two end systems, the transport protocols are designed under the assumption that data will flow along a single Internet path between the two end systems at any given time. Recently, research efforts have been directed towards developing multi-path transport protocols (either as an extension to an existing protocol such as TCP or as a standalone protocol). Multi-path transport protocols transmit the data belonging to an application data object along multiple paths between two end systems at the same time, thereby improving communication performance and fault tolerance. They pool the communication resources available along multiple Internet paths to support a single transport connection. When connectivity disruptions or congestion occurs on some of the utilized paths, the transport connection can still utilize resources along other paths to transmit application data objects, thereby improving communication performance and fault tolerance over unipath transports.

However, multi-path transport protocols typically only pool communication resources in the network in order to increase the robustness and performance concerning transfer of application data objects. When the local resources of one of the two end systems involved in a multi-path communication connection become overloaded or unavailable, communication can still become severely degraded or even entirely disrupted. In client-server communication scenarios, it is often the server-side resources that become overloaded, with the client having ample available capacity. However, especially in the case of a mobile device acting as the client, capacity limitations may exist on the client side, too.

SUMMARY

According to a first example aspect of the invention there is provided a method comprising:

operating in an apparatus a multi-point multi-path transport protocol providing a multi-point multi-path transport connection; and using said apparatus in said multi-point multi-path transport connection as a part of an end system formed by said apparatus and other apparatuses that are physically distinct from said apparatus.

The multi-point multi-path transport protocol, supported by the apparatus, may be a transport layer protocol. It may be a connection oriented transport layer protocol. The transport layer protocol may be a transport layer protocol of the Internet protocol suite (or TCP/IP protocol suite). The transport layer may refer to the ISO OSI model. The multi-point multi-path transport protocol may be a multi-path TCP protocol or a multi-point multi-path TCP protocol or similar. Multi-point to point communications (or multi-point data transfer) using multi-path transport from a multi-point end system may be implemented.

In certain example embodiments, the multi-point multi-path transport protocol is used in bulk transfer of data over the Internet. A client-server system may be involved. Servers or content providers may be involved on the server side. Bulk content may be downloaded from a service or uploaded to a service. The service may be provided via a content distribution network.

In certain example embodiments, said end system forms a server end system of a client-server system. In certain example embodiments, said end system forms a datacenter for data distribution to clients, or a part of it.

In certain example embodiments, the end system is reachable at a set of Internet addresses where said set comprises more than one Internet address. The Internet addresses may be used for sending and receiving. Internet addresses are also known as IP addresses. In a certain example embodiments, said apparatus has at least one of said Internet addresses, whereas other Internet addresses of said set belong to said other apparatuses physically distinct from said apparatus, but belonging to the same end system. In other words, the set of Internet addresses that makes up an end system belongs to more than one physical device/apparatus. In certain example embodiments, said apparatus and said other apparatuses each have mutually different Internet addresses belonging to said set of Internet addresses.

In certain example embodiments, the multi-point multi-path transport protocol provides a multi-path transport connection between multiple Internet addresses belonging to the end system and at least one Internet address belonging to a second end system. In certain example embodiments, a multi-path transport connection, where one end point (or end system) is made up of a set of separate or physically distinct physical machines, is implemented. In certain example embodiments, two-party communication is implemented where at least one of the parties is divided amongst more than one separate or distinct physical apparatuses.

In certain example embodiments, the method comprises:
ensuring that said apparatus and said other apparatuses hold identical data content for the multi-point multi-path transport connection.

In certain example embodiments, the method comprises:
keeping the multi-point multi-path transport connection synchronized between said apparatus and said other apparatuses belonging to the same end system.

The method according to the first example aspect and its example embodiments may be useful in implementing multi-point multi-path transport protocols for content distribution and load balancing. Distributing and end system on a plurality of physically distinct apparatuses extends, in a sense, the resource pooling from network resources to also include end system resources, increasing performance and fault tolerance even when some of the distinct end system apparatuses involved in a data transfer session comprising a plurality of multi-point multi-path transport connections become overloaded or unavailable. In certain example embodiments, load balancing may be effected without application layer support.

According to a second example aspect of the invention there is provided an apparatus comprising:
at least one processor; and
at least one memory including computer program code;
the at least one memory and the computer program code configured to, with the at least one processor, cause the apparatus to perform:

operating a multi-point multi-path transport protocol providing a multi-point multi-path transport connection; and using the apparatus in said multi-point multi-path transport connection as a part of an end system formed by said apparatus and other apparatuses that are physically distinct from said apparatus.

In certain example embodiments, the end system is reachable at a set of Internet addresses where said set comprises more than one Internet address. In certain example embodiments, the apparatus is configured to have at least one of said Internet addresses, whereas other Internet addresses of said set belong to said other apparatuses physically distinct from said apparatus, but belonging to the same end system. In certain example embodiments, said apparatus and said other apparatuses each have mutually different Internet addresses belonging to said set of Internet addresses.

The apparatus may be a wired apparatus or a handheld wireless apparatus, such as a mobile terminal.

In certain example embodiments, the apparatus is configured to form a server end system of a client-server system together with said other apparatuses of the end system.

According to a third example aspect of the invention there is provided a computer program embodied on a computer readable medium comprising computer executable program code which, when executed by at least one processor of an apparatus, causes the apparatus to perform:

operating a multi-point multi-path transport protocol providing a multi-point multi-path transport connection; and using the apparatus in said multi-point multi-path transport connection as a part of an end system formed by said apparatus and other apparatuses that are physically distinct from said apparatus.

According to yet another example aspect of the invention there is provided a memory medium carrying the computer program of the third example aspect. The memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

According to a yet further example aspect of the invention there is provided an apparatus comprising:

means for operating in said apparatus a multi-point multi-path transport protocol providing a multi-point multi-path transport connection; and means for using said apparatus in said multi-point multi-path transport connection as a part of an end system formed by said apparatus and other apparatuses that are physically distinct from said apparatus.

According to yet further example aspect of the invention there is provided an end system comprising:

a plurality of physically distinct apparatuses; wherein said apparatuses are configured to provide a multi-point multi-path transport connection to another end system, and wherein each of the distinct apparatuses are configured to be connected to the Internet with at least one Internet address.

In certain example embodiments, the end system is configured to distribute a logical server to said multiple apparatuses. In certain example embodiments, the end system is configured to transmit data to and/or receive data from another end system via a network in a multi-path fashion, that is, along multiple paths. The Internet addresses used by each of the apparatuses, but used in a same multi-point multi-path transport connection, would typically be mutually different.

For the purpose of certain example aspects and embodiments, it has been observed that existing multi-path transport protocols can be transparently extended from one-to-one communication to one-to-many communication, for example, in client-server scenarios. This extends multi-path transport protocols to multi-point multi-path transport protocols. A result is that a multi-path transport protocol can be used practically without modification for multi-point data transfer, therefore providing a suitable mechanism for implementing multi-path access, for example, to content distribution networks (CDN).

For the purpose of certain example aspects and embodiments, it has been observed that while in certain known multi-path protocols, an end device has multiple IP addresses, the same protocol can basically be used even when the IP addresses belong to different servers (physically distinct apparatuses).

In certain example embodiments, the content is kept identical in various servers forming the end system. Additionally or alternatively, the connection state is kept synchronized between the servers, especially if the protocol is based on the assumption that the servers are only one device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

Figure 1:
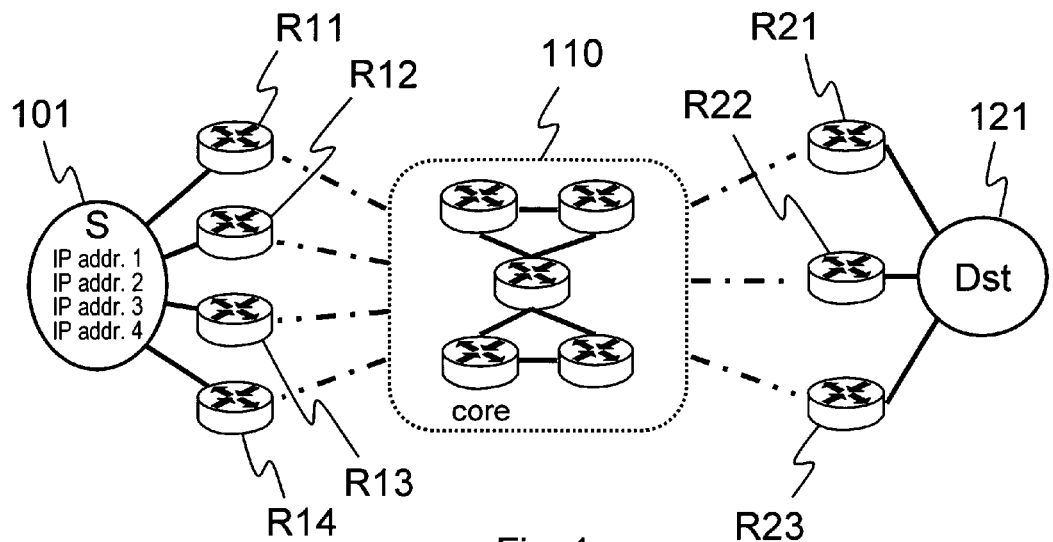
FIG. 1 shows a schematic picture of a system according to prior art.

In the following description, like numbers denote like elements. FIG. 1 shows a schematic picture of a system according to prior art. The system comprises two end systems 101 and 121. For the purpose of certain implementations, such as content distribution networks (CDN), the end system 101 may be assumed a source system (S) and the end system 121 a destination system (Dst). Routing elements (routers, middle-boxes or similar) close to the end system 101 are denoted by reference numbers R11-R14, while the routing elements close to the end system 121 are denoted by reference numbers R21-R23, and the core network comprising routing elements is denoted by reference numeral 110.

The system of FIG. 1 implements a multi-path transport protocol enabling transmission of data belonging to an application data object between end systems 101 and 121 along multiple paths. At least one of the end systems 101 and 121 is reachable at more than one IP address. In the example of FIG. 1, the end system 101 is reachable at multiple IP addresses (IP addr. 1-IP addr. 4).

In a multi-path transport connection, communications between one IP address (for example, IP addr. 1) of the end system 101 and an IP address of end system 121 may flow, for example, via routing element R11, core network 110, and routing element R22, whereas communications between another IP address (for example, IP addr. 2) of the end system 101 and an IP address of end system 121 may flow, for example, via routing element R13, core network 110, and routing element R21 at the same time.

Figure 2:
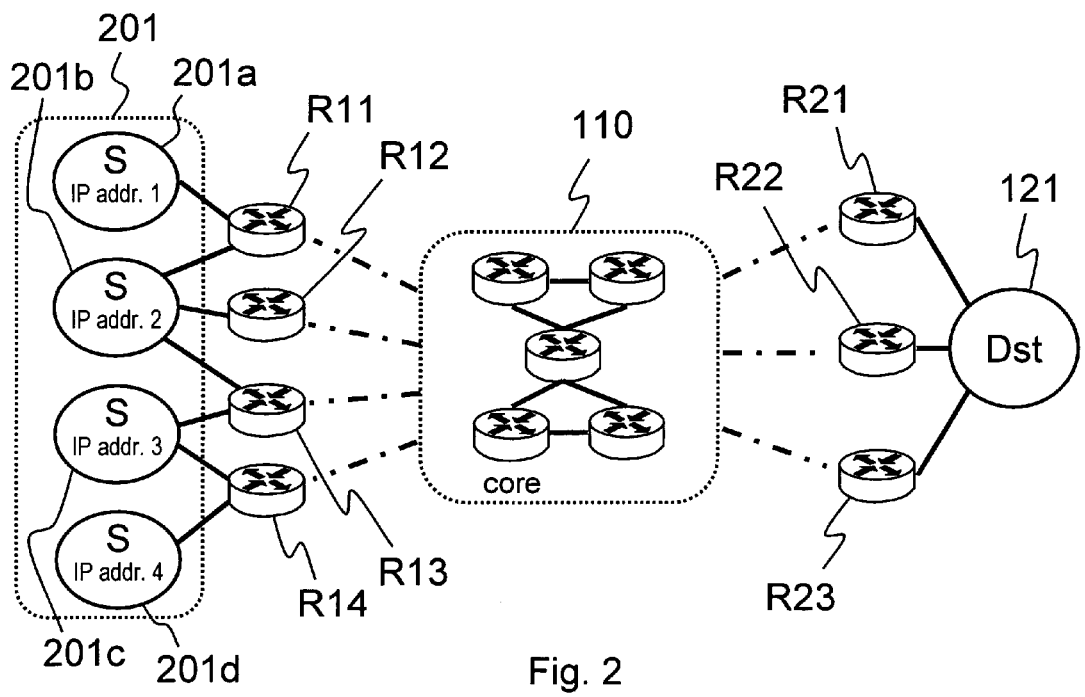
FIG. 2 shows a schematic picture of a system according to certain example embodiments of the invention.

FIG. 2 shows a schematic picture of a system according to certain example embodiments of the invention. The system comprises two end systems 201 and 121. In contrast to what was presented in FIG. 1, at least one of the end systems 201 and 121 is implemented on a set of physically distinct apparatuses (or devices). In the example of FIG. 2, the end system 201 is implemented on a plurality of physically distinct apparatuses 201a-201d each connected to the Internet with at least one IP address.

For the purpose of certain implementations, such as content distribution networks, the end system 201 may be assumed a source system and the end system 121 a destination system. Routing elements (routers, middle-boxes or similar) close to the end system 201 are denoted by reference numbers R11-R14, while the routing elements close to the end system 121 are denoted by reference numbers R21-R23, and the core network comprising routing elements is denoted by reference numeral 110.

The example system of FIG. 2 implements a multi-point multi-path transport protocol enabling distributing at least one end system to a set of physically distinct apparatuses, and enabling transmission of data belonging to an application data object between end systems 201 and 121 along multiple paths. At least one of the end systems 201 and 121 is reachable at more than one IP address. In the example of FIG. 2, the end system 201 is reachable at multiple IP addresses (IP addr. 1-IP addr. 4). In contrast to what was presented in FIG. 1, the multiple IP addresses, instead of belonging to the single end system apparatus 101, are distributed among the physically distinct apparatuses 201a-201d forming together the end system 201. Each of the apparatuses 201a-201d comprise at least one IP address. IP addresses simultaneously in use by the apparatuses are mutually different.

In a multi-point multi-path transport connection, communications between one IP address (for example, IP addr. 1) of end system 201 (belonging to the distinct apparatus 201a) and an IP address of end system 121 may flow, for example, via routing element R11, core network 110, and routing element R22, whereas communications between another IP address (for example, IP addr. 2) of the end system 101 (belonging to the distinct apparatus 201b) and an IP address of end system 121 may flow, for example, via routing element R13, core network 110, and routing element R21 at the same time.

An advantage of the system of FIG. 2 over the system of FIG. 1 is that performance and fault tolerance can be increased over unipath transports even when some of the distinct end system apparatuses 201a-201d (local resources) involved in a data transfer session comprising multi-point multi-path transport connections become overloaded or unavailable.

Figure 3:
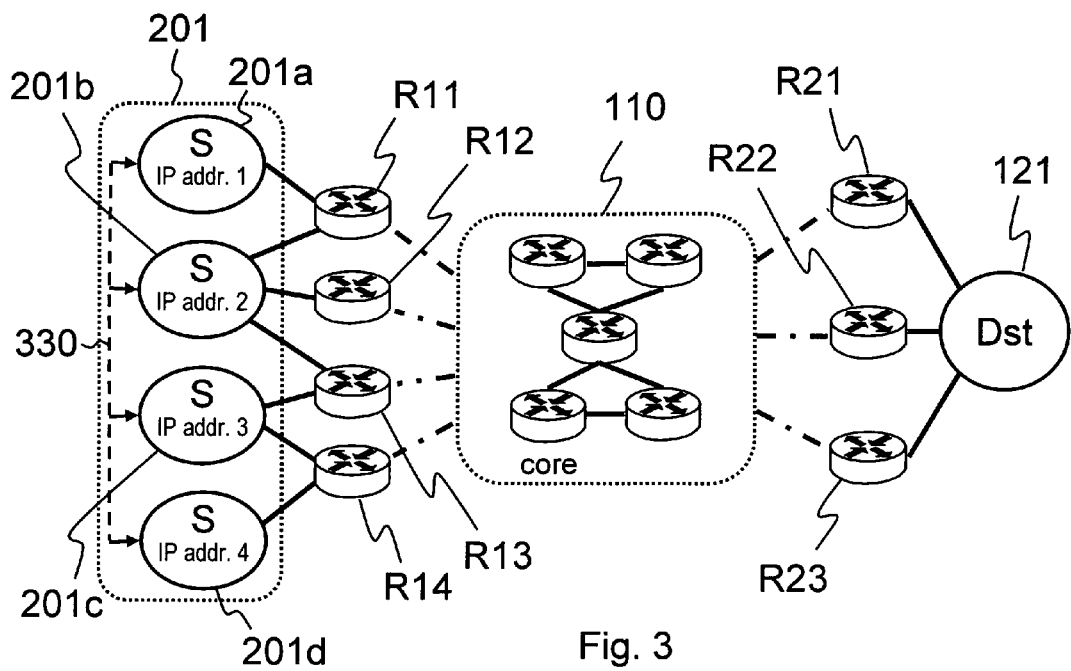
FIG. 3 shows a schematic picture and example operation of a system according to certain example embodiments of the invention.

FIG. 3 shows a schematic picture and example operation of a system according to certain example embodiments of the invention. The system shown in FIG. 3 otherwise corresponds to the system of FIG. 2, but the system of FIG. 3 additionally presents a control connection 330 between the physically distinct apparatuses 201a-201d. For example, in an example embodiment in which a logical content distribution network (CDN) server is distributed to the multiple apparatuses or server devices 201a-201d, the control connection 330 may be used to ensure that each physical server device 201a-201d holds identical data content (the data content would also typically be identified in a suitable uniform manner). The control connection 330 may be implemented by wireless or wired communications. Each apparatus 201a-201d may implement a data replication protocol that automatically keeps the content on the apparatuses/server devices synchronized. Alternatively, manual provisioning may be used, especially in the case of static content, to ensure that each apparatus/physical server device 201a-201d holds identical data content. In certain example embodiments, the control connection 330 is capable of substantially faster communication than the connections to other end systems. This may ensure that from the point of view of the other end systems, the apparatuses 201a-201d appear as a single entity.

Figure 4:
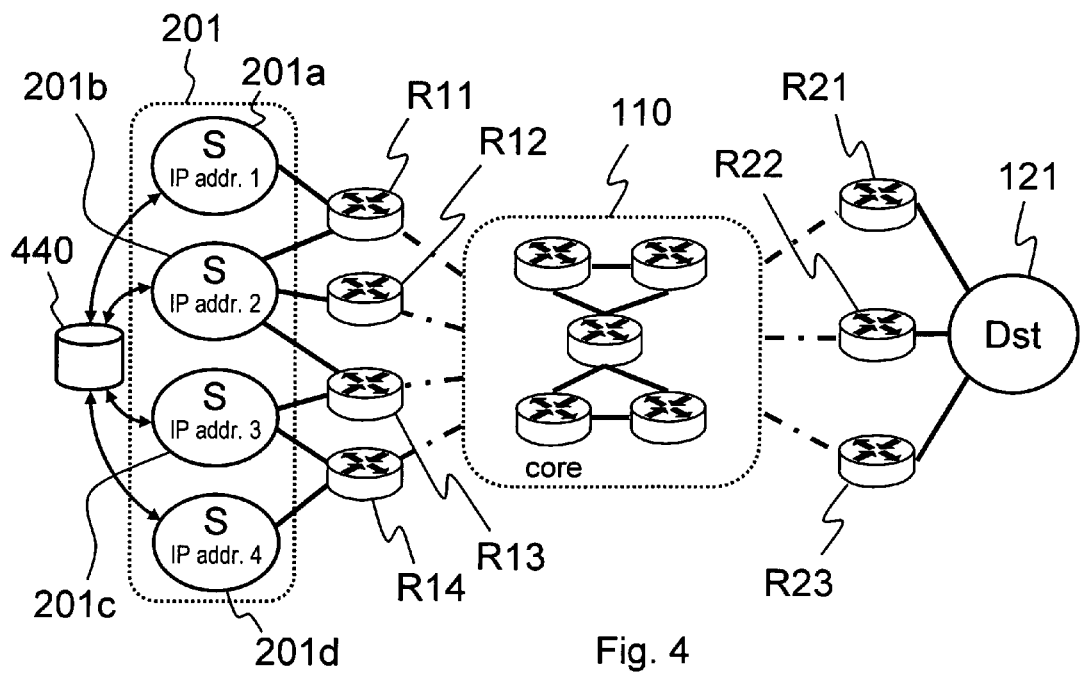
FIG. 4 shows another schematic picture and example operation of a system according to certain example embodiments of the invention.

FIG. 4 shows another schematic picture and example operation of a system according to certain example embodiments of the invention. The system shown in FIG. 4 otherwise corresponds to the system of FIG. 2, but the system of FIG. 4 additionally presents a shared memory or central data store 440 accessible by each of the physically distinct apparatuses of the end system 201. For example, in an example embodiment in which a logical content distribution network (CDN) server is distributed to the multiple apparatuses or server devices 201a-201d, the shared memory or central data store 440 may be used to ensure that each physical server device 201a-201d holds identical data content (that is, the content centrally located in the shared memory of data store 440).

In certain alternative example embodiments, the end system 201 may comprise both the control connection 330 and the shared memory or central data store 440. Certain additional/alternative example embodiments concern maintaining connection state of transport connections. If maintenance of a connection state is either desired or required, as may be the case in certain protocols (which may require maintenance of connection state on both ends of communication), a suitable connection state synchronization mechanism may be used. This mechanism in certain example embodiments automatically shares and synchronizes the connection state among the set of physical devices (apparatuses 201a-201d) that make up the logical end point (end system 201).

In certain example embodiments, the shared memory 440 of the example system shown in FIG. 4 may be used to synchronize the connection state. In other embodiments, the connection state or information pertaining to the connection state may be broadcasted between the apparatuses 201a-201d. In certain example embodiments the control connection 330 of the example system shown in FIG. 3 or similar may be used.

It would be beneficial if the connection state synchronization happens at timescales that are shorter or much shorter than the round-trip-time of the multi-path transport connection, to avoid delaying data transfer. In a datacenter scenario, for example, a very low-delay network connectivity typically exists between the physical devices (apparatuses 201a-201d) making up a multi-path end point (end system 201), which can be used to implement a connection state synchronization mechanism. Because the amount of data required to share connection state is typically very small, the bandwidth requirements for the mechanism are usually negligible compared to the external bandwidth requirements needed to serve clients.

Figure 5:
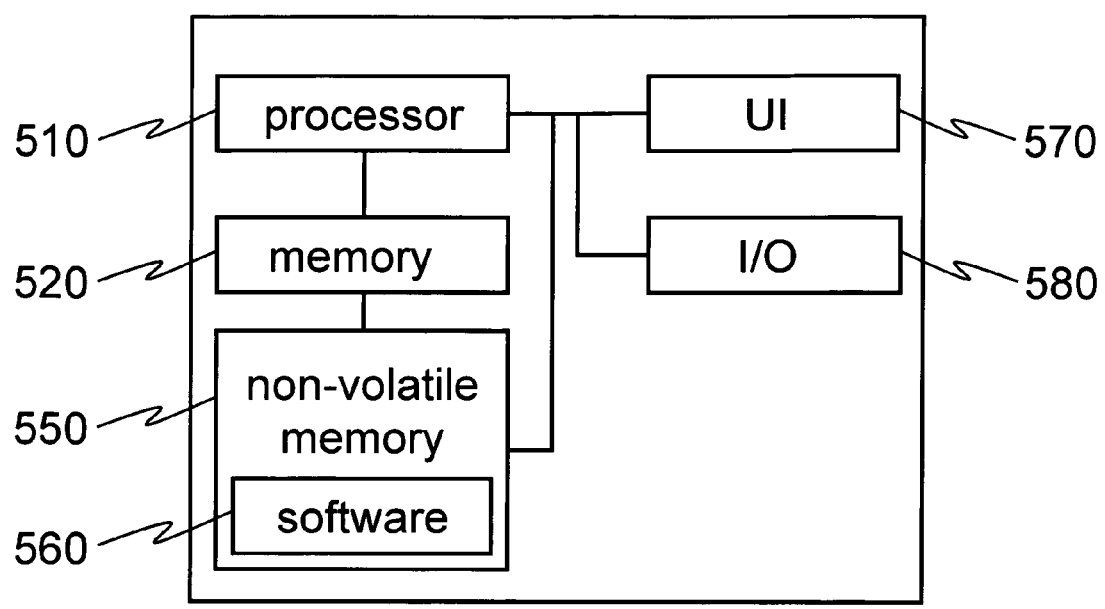
FIG. 5 shows an example block diagram of an apparatus according to certain example embodiments of the invention.

FIG. 5 shows an example block diagram of an apparatus 500 according to certain example embodiments of the invention. The apparatus 500 is suitable for functioning as any of the apparatuses 201a-201d or the apparatus 121. It may be a wired apparatus or a handheld wireless apparatus.

The apparatus 500 comprises at least one non-volatile memory 550 configured to store computer program code (or software) 560. The apparatus 500 further comprises at least one processor 510 for controlling the operation of the apparatus 500 using the computer program code 560, a work memory 520 for running the computer program code 560 by the at least one processor 510, and an input/output system (or communication unit) 580 for communicating with other entities or apparatuses. It also typically comprises a user interface 570 including a display and keyboard or keypad for user interaction. The at least one processor 510 may be a master control unit (MCU). Alternatively, the at least one processor 510 may be a microprocessor, a digital signal processor (DSP), an application specific integrated circuit (ASIC), a field programmable gate array, a microcontroller or a combination of such elements.

As to the operations of the embodiments of the invention, when the computer program code 560 is executed by the at least one processor 510, this causes the apparatus 500 to implement operations of a multi-point multi-path transport protocol providing a multi-point multi-path transport connection, and to further implement the operations of using the apparatus 500 in the multi-point multi-path transport connection as a part of an end system formed by said apparatus 500 and other apparatuses that are physically distinct from said apparatus 500. These operations may, among other things, comprise ensuring that the apparatus 500 holds identical data content as the other apparatuses forming the end system, and/or synchronizing connection state with the other apparatuses of the end system. These operations may alternatively or additionally comprise implementing a server functionality together with said other apparatuses of the end system (server end system), and/or transmitting content from the at least one non-volatile memory 550 or from an external memory to a destination end system (client end system).

In certain example embodiments, the program code 560 comprises program code for implementing an operating system, wherein the operating system causes the apparatus 500 to implement operations of a multi-point multi-path transport protocol providing a multi-point multi-path transport connection, and to further implement the operations of using the apparatus 500 in the multi-point multi-path transport connection as a part of an end system formed by said apparatus 500 and other apparatuses that are physically distinct from said apparatus 500.

Depending on the implementation, in certain example embodiments, the multi-point multi-path transport protocol is an existing transport protocol extended to multi-point multi-path transport operations, or another suitable protocol. Providing a multi-point multi-path transport protocol typically removes the reliance on the DNS or other external protocols to locate the peers for transfer, and load balancing decisions can typically be made on timescales that are much shorter than DNS timeouts. In certain embodiments, user perceived performance at the client is increased, since multi-point multi-path transport would typically push the transfer bottleneck towards the client.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
   operating in an apparatus a multi-point multi-path transport protocol providing a multi-point multi-path transport connection using said apparatus in said multi-point multi-path transport connection as a part of a distributed logical server formed by said apparatus and other apparatuses that are physically distinct from said apparatus;
   keeping the multi-point multi-path transport connection synchronized between said apparatus and said other apparatuses belonging to the same distributed logical server;
   wherein the distributed logical server is reachable at a set of Internet addresses where said set comprises more than one Internet address; and
   wherein said apparatus is reachable at at least one, but fewer than all, of said Internet addresses, and wherein other Internet addresses of said set belong to said other apparatuses physically distinct from said apparatus of said set, but belonging to the same distributed logical server, and wherein at least one of the other apparatuses is reachable to said apparatus at at least one of the other Internet addresses of said set.

2. The method of claim 1, wherein said apparatus and said other apparatuses each have mutually different Internet addresses belonging to said set of Internet addresses.

3. The method of claim 1, wherein the multi-point multi-path transport protocol provides a multi-path transport connection between multiple Internet addresses belonging to the distributed logical server and at least one Internet address belonging to a second distributed logical server.

4. The method of claim 1, wherein said distributed logical server forms a server end system of a client-server system.

5. The method of claim 1, comprising:
   ensuring that said apparatus and said other apparatuses hold identical data content for the multi-point multi-path transport connection.

6. The method of claim 1, comprising:
   keeping the multi-point multi-path transport connection state synchronized between said apparatus and said other apparatuses belonging to the same distributed logical server.

7. An apparatus comprising:
   at least one processor; and
   at least one memory including computer program code;
   the at least one memory and the computer program code configured to, with the at least one processor, cause the apparatus to perform actions comprising at least:
   operating a multi-point multi-path transport protocol providing a multi-point multi-path transport connection; and
   using the apparatus in said multi-point multi-path transport connection as a part of a distributed logical server formed by said apparatus and other apparatuses that are physically distinct from said apparatus;

keeping the multi-point multi-path transport connection synchronized between said apparatus and said other apparatuses belonging to the same distributed logical server;

wherein the distributed logical server is reachable at a set of Internet addresses where said set comprises more than one Internet address; and wherein said apparatus is reachable at at least one, but fewer than all, of said Internet addresses, and wherein other Internet addresses of said set belong to said other apparatuses physically distinct from said apparatus of said set, but belonging to the same distributed logical server and wherein at least one of the other apparatuses is reachable to said apparatus at at least one of the other Internet addresses of said set.

8. The apparatus of claim 7, wherein said apparatus and said other apparatuses each have mutually different Internet addresses belonging to said set of Internet Addresses.

9. The apparatus of claim 7, wherein the multi-point multi-path transport protocol provides a multi-path transport connection between multiple Internet addresses belonging to the distributed logical server and at least one Internet address belonging to a second distributed logical server.

10. The apparatus of claim 7, wherein said apparatus is configured to form a server end system of a client-server system together with said other apparatuses of the distributed logical server.

11. The apparatus of claim 7, wherein
the at least one memory and the computer program code are configured to, with the at least one processor, cause the apparatus to perform:
ensuring that said apparatus holds identical data content with said other apparatuses for the multi-point multi-path transport connection.

12. The apparatus of claim 7, wherein
the at least one memory and the computer program code are configured to, with the at least one processor, cause the apparatus to perform:
keeping the multi-point multi-path transport connection synchronized between said apparatus and said other apparatuses belonging to the same distributed logical server.

13. A computer program embodied on a non-transitory computer readable medium comprising computer executable program code which, when executed by at least one processor of an apparatus, causes the apparatus to perform actions comprising at least:
operating a multi-point multi-path transport protocol providing a multi-point multi-path transport connection; and
using the apparatus in said multi-point multi-path transport connection as a part of a distributed logical server formed by said apparatus and other apparatuses that are physically distinct from said apparatus;
keeping the multi-point multi-path transport connection synchronized between said apparatus and said other apparatuses belonging to the same distributed logical server;

wherein the distributed logical server is reachable at a set of Internet addresses where said set comprises more than one Internet address; and wherein said apparatus is reachable at at least one, but fewer than all, of said Internet addresses, and wherein other Internet addresses of said set belong to said other apparatuses physically distinct from said apparatus of said set, but belonging to the same distributed logical server and wherein at least one of the other apparatuses is reachable to said apparatus at at least one of the other Internet addresses of said set.

14. The computer program of claim 13, wherein
the computer executable program code, when executed by at least one processor of an apparatus, causes the apparatus to perform:
ensuring that said apparatus holds identical data content with said other apparatuses for the multi-point multi-path transport connection.

15. The computer program of claim 13, wherein
the computer executable program, when executed by at least one processor of an apparatus, causes the apparatus to perform:
keeping the multi-point multi-path transport connection synchronized between said apparatus and said other apparatuses belonging to the same distributed logical server.

16. The method of claim 1, further comprising configuring the apparatus and one or more of the other apparatuses to communicate using a control connection.

17. The method of claim 1, further comprising configuring the apparatus and the other apparatuses to appear as a single entity to devices communicating with the distributed logical server formed by the apparatus and the other apparatuses.

18. The apparatus of claim 7, wherein the apparatus and one or more of the apparatuses communicate using a control connection.

19. The method of claim 7, wherein the apparatus and the other apparatuses appear as a single entity to devices communicating with the distributed logical server formed by the apparatus and the other apparatuses.

20. The method of claim 13, wherein the apparatus and one or more of the apparatuses communicate using a control connection.

21. The method of claim 13, wherein the apparatus and the other apparatuses appear as a single entity to devices communicating with the distributed logical server formed by the apparatus and the other apparatuses.

* * * * *